June 7, 1960 P. M. G. TOULON 2,940,005

VARIABLE DISCONTINUOUS INTERLACED SCANNING SYSTEM

Original Filed July 18, 1951 6 Sheets-Sheet 1

INVENTOR

Pierre M. G. Toulon

BY [signature]

ATTORNEYS

INVENTOR
Pierre M. G. Toulon
BY
ATTORNEYS

June 7, 1960 P. M. G. TOULON 2,940,005

VARIABLE DISCONTINUOUS INTERLACED SCANNING SYSTEM

Original Filed July 18, 1951 6 Sheets-Sheet 3

INVENTOR

Pierre M.G. Toulon

BY Morse & Hall

ATTORNEYS

INVENTOR
Pierre M. G. Toulon
BY [signature]
ATTORNEYS

VARIABLE DISCONTINUOUS INTERLACED SCANNING SYSTEM

Original Filed July 18, 1951 6 Sheets-Sheet 5

INVENTOR
Pierre M. G. Toulon
BY Moore & Hall
ATTORNEYS

First Field-Odd Lines - Uses $C_1$ And $C_4$ Of Fig. 5
Second Field-Even Lines - Uses $C_8$ And $C_5$ Of Fig. 5

Legend

- Red
- Blue
- Green
- Yellow

INVENTOR
Pierre M. G. Toulon
BY Moore & Hall
ATTORNEYS

United States Patent Office 2,940,005

Patented June 7, 1960

2,940,005

VARIABLE DISCONTINUOUS INTERLACED SCANNING SYSTEM

Pierre Marie Gabriel Toulon, Pittsburgh, Pa., assignor, by mesne assignments, to Moore and Hall, Washington, D.C., a partnership Continuation of application Ser. No. 237,372, July 18, 1951. This application June 3, 1957, Ser. No. 663,055

Claims priority, application France July 19, 1950

12 Claims. (Cl. 315—21)

The present invention is concerned with a new process of television which permits the reduction of the band-width to be used for transmission while maintaining the same high quality of picture, or again, the improvement of the quality of picture without increasing the band-width necessary for transmission. The invention is applicable particularly to the transmission of pictures in color, especially for the three-color-process.

The present invention concerns discontinuous interlaced scanning systems and is an improvement on my basic invention set forth in United States Patent No. 2,479,880 granted to me August 23, 1949 and is a continuation-in-part of my copending "Key Select," U.S. application Serial No. 149,062, filed March 11, 1950, now abandoned, to which reference is made for a detailed discussion of certain parts of the apparatus disclosed herein, and a continuation of Serial No. 237,372, filed July 18, 1951, now abandoned.

Although the present invention is of general application wherever it is desired to reduce the bandwidth required for a given accuracy of transmitted picture or, conversely, to increase the accuracy of the transmitted picture for a given width of frequency band, it is particularly useful for the transmission of color pictures by the trichrome process.

It is an object of the invention to reduce the frequency bandwidth required for the transmission of signal data yielding a picture of given accuracy or, conversely, to increase the effective data which can be transmitted over a frequency band of given width with a resultant increase in the accuracy of detail in the picture transmitted.

In the employment of present day techniques for color, one is obliged in effect, in order to obtain the same definition of image, to transmit in general three times as many signals per second than is necessary in black and white television. As a result, the transmission channels, particularly the subterranean coaxial cables, are no longer usable, or one must expect a large reduction in definition of the image, i.e. reduction in the number of lines and an increase in the size of points.

The present invention permits, on the contrary, the transmission of pictures in color with the presently existing channels while maintaining the same quality of image.

The invention permits, moreover, the assurance of secrecy of transmission as claimed in my copending "Key Select" case, supra. By the word "secrecy" it is to be understood that the transmission is made in such a way that with a standard receiver not equipped with the arrangement forming the object of the present invention, one receives only a scrambled image, whereas only the apparatus in conformity with the invention in the hands of operators knowing the key of the transmission, is able to reproduce the image entirely faithfully.

The invention is based on the principle of the transmission of successive eletric currents corresponding to the points of image which are separated one from the other.

One knows that in the present systems of television one transmits, one right after the other, the electric currents corresponding to the illumination of all the points of a line, generally all the points of a horizontal line. Then one explores separately the different successive lines or better (interlaced transmission), one transmits first of all the odd lines corresponding to a first scanning of the picture, then the even lines corresponding to a second scanning of the same picture, then again the odd lines of the image following, and so on alternatively.

Discontinuous interlaced scanning employs the transmission of successive electrical currents which respectively correspond to dots separated from one another. These signals correspond respectively to the luminosity of portions of picture lines which are scanned successively by interlaced scanning in which the television beam sweeps the even lines and then the odd lines of the picture. This is explained fully in column three of my basic patent noted above.

According to the present invention it is proposed to increase the previous interval of every other line used in normal interlace scanning to four or more lines. Lines located in between the lines scanned during the first frame are successively scanned in the course of multiple successive scanning of succeeding frames. To achieve the desired result the electron beam is interrupted periodically so that it is lighted for only very short time intervals corresponding to dots which appear on the screen quite independently of one another.

The above result is achieved by varying the speed of the spot caused by the electron beam on the screen of the cathode ray tube used. That is the beam is held substantially motionless during the lighting of a dot and then is moved very rapidly to form another dot removed an appropriate distance from the preceding dot in accordance with the particular dot interlace system employed. As the speed of the dot when moving from one spot to another is quite high and the time interval very short compared with the time allotted for lighting a spot the trace formed is relatively faint and an acceptable picture is produced. However, the electron beam is preferably interrupted during the interval of shift or travel from one dot to another.

The electron beam control electrodes are supplied with a horizontal saw tooth displacement voltage yielding high speed and a vertical saw tooth displacement voltage yielding low speed. In addition the beam is given an initial shift at the beginning of each line which is maintained during the scan of that line.

For the purpose of understanding the invention the picture or the screen of the cathode ray tube being used may be thought of as being divided up into small squares representing dots or elemental picture elements which combine to form a checkerboard. The picture or screen is made up of a number of such checkerboards, depending upon the number of squares or dots in each checkerboard. For example, such a checkerboard may be composed of four dots on a side, making sixteen dots in each checkerboard.

In my basic Patent No. 2,479,880 the same checkerboard was always used for successive groups of sixteen dots making up the complete picture. As a result always the same sequences were repeated. That is, the first dot scanned of each checkerboard might have checkerboard coordinates 1, 1 and the next dot scanned might have coordinates 3, 2 of the same checkerboard and so on until all sixteen dots of each checkerboard comprising the picture were scanned in sequence and the cycle repeated. The point is the second cycle and each succeeding were mere repetitions of the first cycle. Sixteen fields were required to complete a frame of the picture and each cycle of sixteen fields and the frame resulting were the same.

It is an object of the present invention to provide a scanning system which employs a plurality of different checkerboards. These different checkerboards may be used in succession to form successive cycles of differing numbers of frames or they can be interlocked to form overlapping cycles. The order of succession of checkerboards used may be modified to yield a great number of possible combinations. The order or particular sequence of checkerboards selected may be utilized as the key for secret transmission as discussed at length in my copending application.

Checkerboards of four, nine, six, twelve, sixteen, twenty, twenty-five or more dots can be used.

In the case of the sixteen dot checkerboard discussed in my basic patent the saw tooth deflection voltages are so selected that only every fourth horizontal line is scanned and the beam is turned on only for every fourth dot. That is for the first field only the upper left band dot in each checkerboard is scanned, the checkerboards having four dots on a side. With the present invention, for each dot lighted and additional electrostatic or electrode magnetic voltage is impressed upon the deflection plates providing a selected variation in the choice of dot to be scanned and in the sequence of dots to be scanned. This concept may be utilized with repetition cycles using the same checkerboard as in my copending application or it may be combined with a selected sequence of different checkerboards as in the present invention.

In the process according to the invention, instead of exploring alternatively the even lines and odd lines, one preferably increases the interval between explored lines, that is to say, that one explores for example one line out of three or one line out of four, and one continues afterward to explore the other lines in the course of successive scannings of the picture. Moreover, one interrupts the electronic beam periodically in such a manner that the scanned line only is lighted during very short instants, which thus provide separated points. According to a first variation of the invention, the scanning is to be made at a constant speed. According to a perfected variation, it is accomplished at a variable speed so that the spot remains practically stationary during the illumination of each point, then it moves afterward very rapidly to a following point, during the same time that the beam is interrupted. In the arrangement according to the invention, the electronic beam undergoes, as is usual, a horizontal displacement in a sawtooth manner, at a high speed and a vertical displacement likewise saw tooth, at a low speed, but it undergoes besides, at the beginning of each scanning, an additional initial displacement which is maintained during the scanning. As a consequence of the interruption, the beam is rendered visible only for very limited positions of the screen for each scanning. The initial displacement at the beginning of each scanning has a result that the position of the illuminated points in the course of successive scannings is different.

According to the invention, the image is divided, as mentioned above, into a certain number of checkerboards, each comprising a certain number of squares or areas. For example, each checkerboard comprises four squares in the horizontal direction and four squares in the vertical direction, that is, sixteen squares. According to the new technique, one scans the image as many times as there are squares in the checkerboard; for example, sixteen times, and employs each time a different square of the checkerboard. The order of exploration of the different areas of the square can be selected at will so that there exists a very large number of possible combinations in the order of scanning.

Instead of the four-by-four, that is sixteen squares, one is able, of course, to have all other combinations, for example, two by two squares, that is four squares; three by three, that is nine squares; five by five, that is twenty-five squares; three by four, that is twelve squares; five by four and two by three squares, that is six squares, etc.

The invention is characterized by the new process which permits the selection of the exploration of the point in each square in the course of each of the successive scannings. This process consists of the application, electrostatically or electromagnetically, of an added deviation force at the beginning of each scanning of the picture. In the example of a checkerboard of four-by-four squares, and in the absence of all added deviation force, it is arranged so that the result is the normal saw tooth scanning corresponding to the exploration of one line in four, and it is also arranged that the duration of illumination of the screen corresponds only or solely to one point in four. Under these conditions, one only of the squares (in the four-by-four, that is sixteen areas of checkerboard) that which is located on the upper left and is designated number 1, is alone explored in the course of the first scanning. In conformity with the invention, the electrostatic or electromagnetic force applied additively during each of the sixteen explorations therefore permits the change of position of the point explored and the application of a predetermined order of exploration.

When one employs electrostatic deviation, one applies preferably to the first of the deviation plates (vertical and horizontal), the voltages of the saw tooth line frequency and image frequency obtained in the standard manner, and one applies to the second deflection electrodes of each group of deflectors, which are normally maintained at a fixed voltage, combinations of signals having the appropriate values of voltages which correspond to the selected square of the checkerboard. If one makes use of magnetic deviation, one adds by preference, to the deviation windings fed in the standard manner, the other windings exercising the desired added force or again one adds to the current supplied by the generator of the saw tooth voltage to that which is supplied by the auxiliary deviation generator.

According to one preferred arrangement, the successive values of voltage necessary to assure the added displacement, are obtained by a static process, and by the aid of electrical circuits comprising electronic tubes or rectifiers.

According to the invention, one connects to each of the conductors supplying the second plate of the two deviation systems, the pulses of rectangular form in the course of time having a given amplitude and produced at determined periods synchronized with the scanning.

In the squares of a checkerboard of four-by-four, that is sixteen points, the amplitudes of these signals have those values which correspond to the whole numbers of successive multiples of a certain voltage taken as a unity. They correspond, therefore, to zero, 1V, 2V, 3V. The value four volts would be effective to give a deviation equal to that which is normally produced at the end of each line of scanning by saw tooth, that is to say, to the interval between two successive lines of the image. If one assumes that the checkerboards and the points are substantially square, that distance is equal to that which separates two consecutive points explored on each line.

One selects, in conformity with the invention, at the beginning of each scanning of image, the point of the checkerboard which will be employed in applying to the vertical and horizontal deflection plates, the one of the specific values above, that is, zero, 1V, 2V, 3V, in the horizontal direction and that is zero, 1V, 2V, 3V in the vertical direction. One maintains that added voltage during the entire scanning of an image and one changes the value of it before the beginning of the following scanning, which thus for the remainder utilizes one other area in each checkerboard.

According to a preferred arrangement, one employs a current generator supplying 16 pulse values of voltage shifted in relation to one another. This generator is synchronized on the end of image signal and the duration of each pulse value corresponds to the duration of a scanning of image. One limits successively the amplitude of each of these voltage pulses by means of a rectifier of which one regulates the polarity as a function of the scanning chosen; one thus obtains periodically 16 successive signals having a duration and determined amplitude on each of the two independent conductors. One adds the effect of the corresponding signals to each of the pulse values so as to act on each of the secondary deviation plates.

In the system which has just been described a complete scanning of image is effectuated employing always the same combination of checkerboards. According to an employed variation of the invention the combination varies in the course of scanning. That modification can be realized for consecutive checkerboards of a same horizontal line or else modified only at the end of each line of the checkerboard.

In order to put this preferred arrangement to work, one makes use of several signal device generators. One superimposes their effects upon the auxiliary deflection electrodes. These signals correspond to the duration of exploration of one portion of the image or to the duration of exploration of one line, or else, to the duration of the exploration of one checkerboard.

With the present invention the order of the successive combinations to be used in the course of scanning is changed at the beginning of each field, the beginning of each group of lines scanned, or both, or at the beginning of each selected group of fields, after being maintained for the selected period. The successive sequences of voltage values to be added can be obtained mechanically by using means such as a rotating commutator. However, it is preferred to employ an impulse generator in which the pulses are phase shifted to correspond to the number of dots in the particular checkerboard or boards concerned. This impulse generator is synchronized on the end of field. A periodic phase shifter may be used if desired. The complex signal produced by the generator corresponds in length to the length of a field scanning or a group of fields as the case may be. The term length as here used is really a graphic representation of time. The amplitude of successive signals is limited by the use of a biased rectifier, the amplitude of the bias being fixed in turn in accordance with the order of checkerboard scanning selected. One can obtain periodically sixteen successive signals having a duration and amplitude which can be exactly determined and applied to the deflection system of a cathode ray tube. Periodic phase shift corresponding to a change of the combination need be used only if desired. When multiple signals are used the effects are added and act through the second set of plates of the tube deflecting system.

The same checkerboard scanning order may of course be used for scanning an entire frame, but this tends to produce a "moving grid" effect which is a local flicker that can be eliminated by changing the combination used in each successive checkerboard or by having different checkerboards follow each other. The simplest solution is obtained by altering the dot scanning sequence and continuing with the same checkerboard, but it is possible to have different checkerboards follow each other even though the dot scanning sequence for similar checkerboards in the sequence is changed also.

Excellent results are obtained by the use of two or more independent local deflecting signals the effects of which are superimposed to produce the auxiliary local deflecting system. One sequence of signals may provide deflections for a six dot checkboard, one sequence for another gorup. The combination of the two may in some case produce a checkboard of a third grouping of dots. Other local signals will produce the discontinuous scanning within a given checkerboard and so on. The principal thing to guard against is to check the resultant of all the local signals combined and determine that they do not interfere with each other's effects and that the resultant does not produce effects such as described above in connection with the use of a local deflection signal of 4V with a sixteen dot checkerboard. The repetition period or cadence of those auxiliary signals may correspond to a fraction of a line, a group of lines, a field, a group of fields or a frame, but the law or sequence of scanning must be the same at both the sending and receiving stations and the stations must be synchronized.

It is to be understood that the invention is not limited to the process in which the electron beam is totally interrupted, but is also applicable to the case where the beam is modulated close to cut off or sufficiently to reduce the spot brilliance a desired amount during beam shift of my improved discontinuous interlace scanning.

For some applications the modulation of the beam as just discussed may be accomplished at the transmitter and the sending of a carrier wave which has been periodically interrupted or reduced in amplitude can eliminate the need of doing so at the receiver. This can be of value where a plurality of receiving sets can be reduced to a cathode ray tube supplied from a central receiver as in hotels or the like.

The invention is not limited to the systems in which one interrupts the beam locally at the receiving set. The invention also covers those arrangements comprising a more or less complete modulation of the intensity of the cathode beam which appears and disappears periodically according to a selected sequence on the scanned line. In view of certain applications one purpose of the invention is not to exercise local control at the reception, but reach the same result by exercising at the transmitter on the transmitted signals of image a modulated action so that during certain intervals of time, no effective signal will appear on the receiving screen. In this case the cutoff produced during the displacement of the cathode beam is added to the received signal and it has become unnecessary to provide modulation at the receiving set.

One will understand better the characteristics, the manner of functioning and the advantages of the invention by a reference to the description and the following figures which are offered by way of illustration and not by way of limitation in accordance with different forms of the invention intended to serve by way of example and to suggest variations.

The Figures 1, 2, 3 and 4 explain the order of exploration of points which one is able to select in the course of successive scannings. The Figure 1 refers to a checkerboard of 6 points, the Figure 2 to a checkerboard of 9 points, the Figure 3 to a checkerboard of 12 and the Figure 4 to a checkerboard of 16 points.

Figure 5 indicates the different combinations from $C_1$–$C_{24}$ and exploration of which one is able to obtain by means of a figure of only 4 points.

Figure 4:
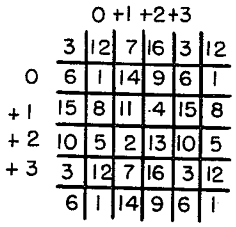
Figure 10:
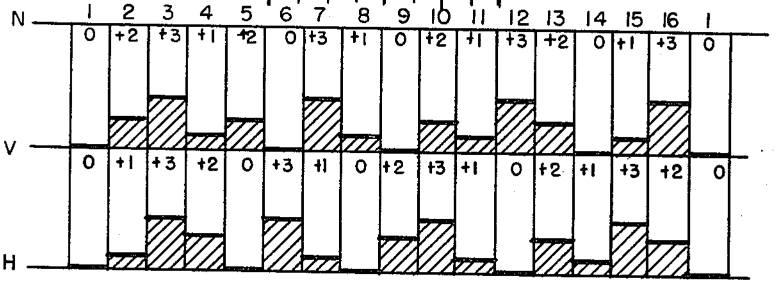

Figure 10 describes as a function of time the voltages which it is desirable to apply successively to the vertical and horizontal deflection electrodes to obtain the scanning of 16 points in accordance with the Figure 4.

Figure 11:
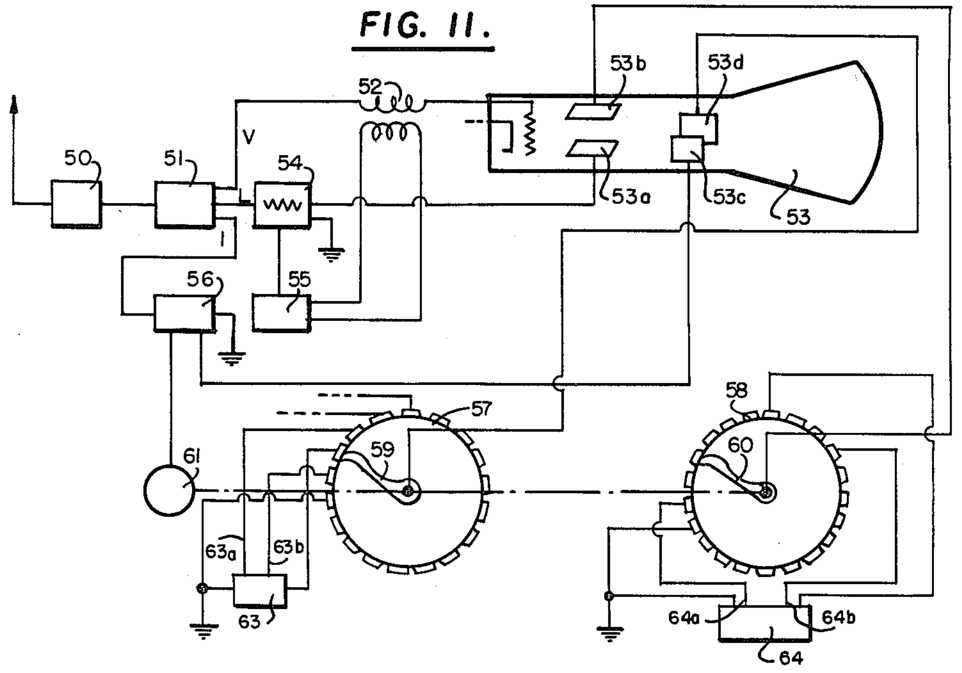

Figure 11 is a circuit diagram for obtaining dot interlace scanning according to the invention as part of a system providing secrecy of image.

Figure 12:
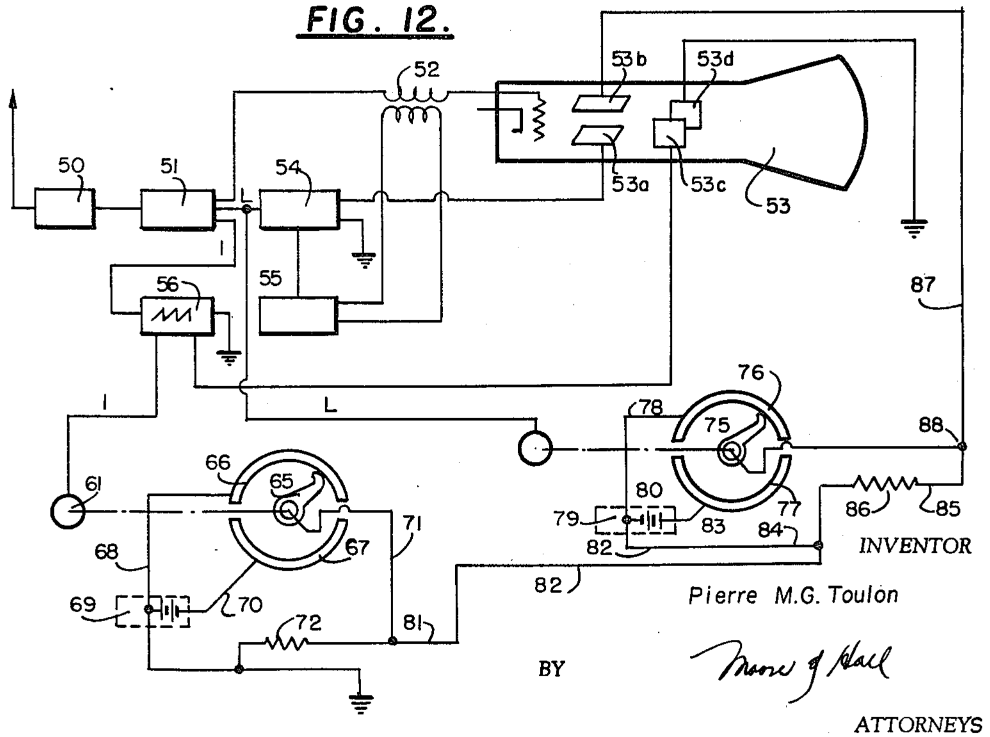

Figure 12 is another form of circuit diagram comprising a variation of Figure 11.

Figure 13:
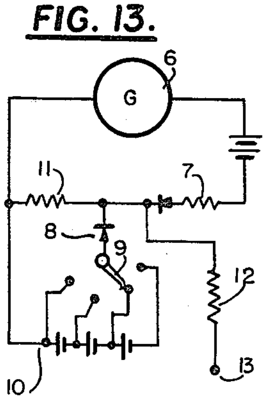

Figure 13 is an elementary unit circuit diagram showing how dot interlace scanning can be achieved and used to provide secrecy of image.

Figure 14:
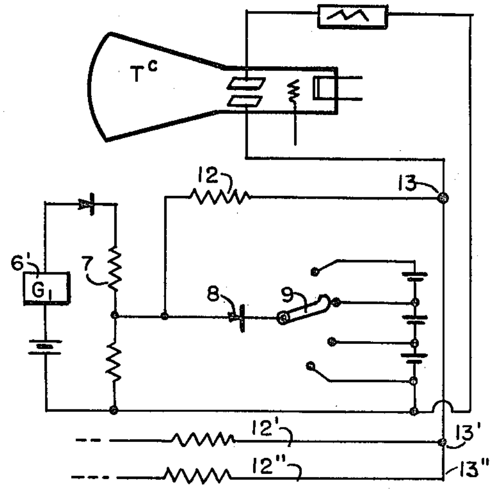

Figure 14 is a working diagram showing how the unit circuit diagram of Figure 13 is employed by multiples in parallel and with certain elements indicated for clarity which in Figure 13 are taken as part of the generator symbol.

Figure 15:
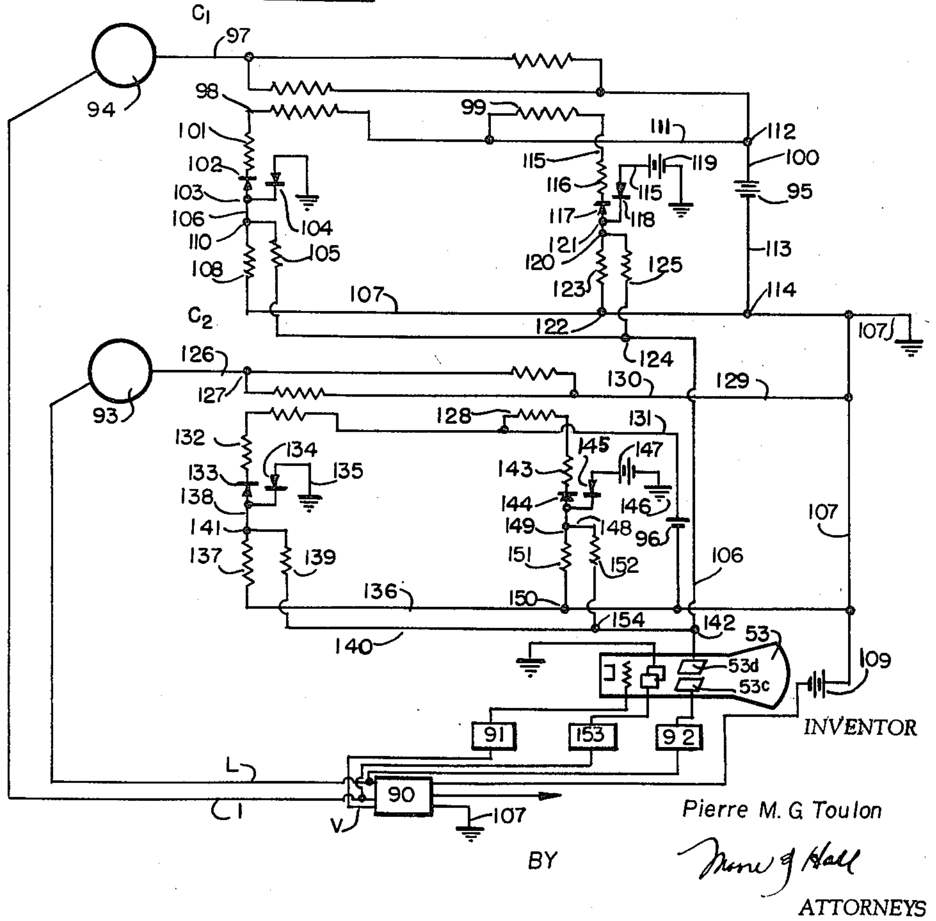

Figure 15 explains how one is able to obtain statically and at the beginning of each exploration the desired displacement of the cathode beam.

Figure 16:
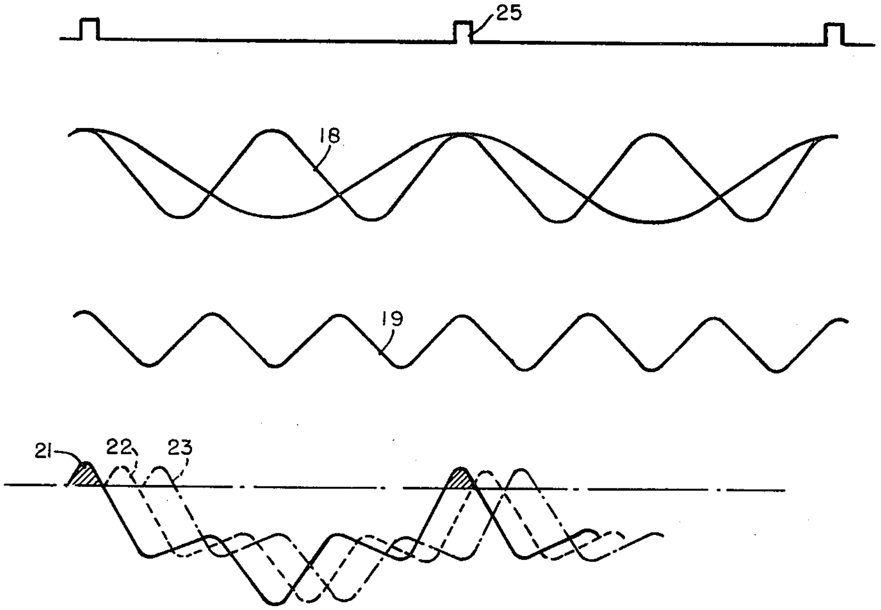

Figure 16 recalls how one is able to obtain as a function of time the voltage pulses in point form shifted from one another.

Figure 17:
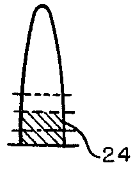

Figure 17 shows how one is able to limit the amplitude of these points so as to obtain a substantially rectangular signal.

Figure 18:
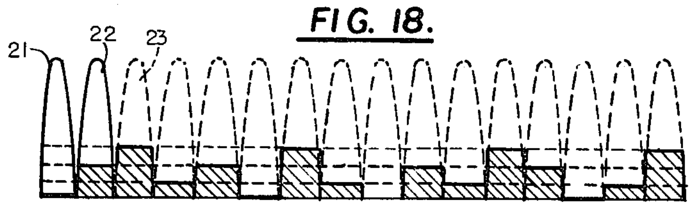

Figure 18 explains as a function of time how from these points one obtains statically the necessary signals for the exploration of a checkerboard of 16 squares.

Figure 19:
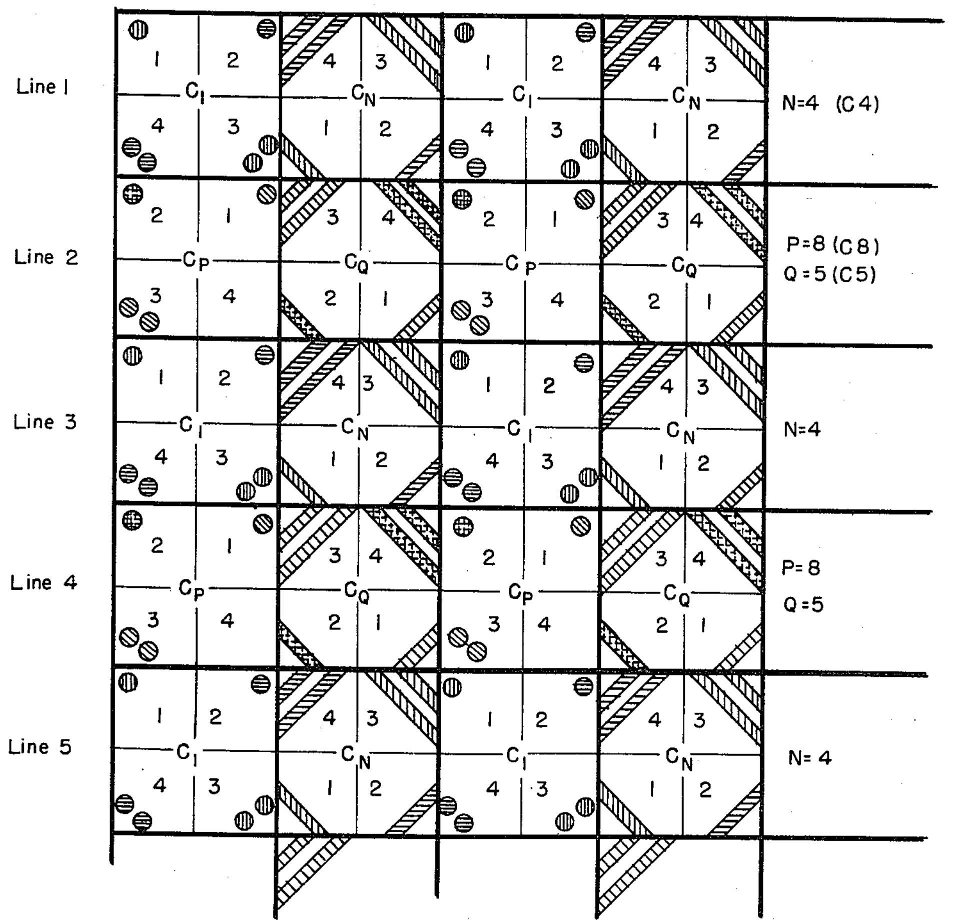

Figure 19 is a graphic statement of the invention as a scanning system.

Figure 1:
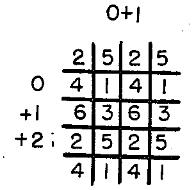

As represented in Figure 1, the image, which comprises for example 450 lines of 500 points, is divided into a certain number of checkerboards, comprising two points in the horizontal sense, and three points in the vertical sense. One has therefore 450 divided by 3, that is 150 checkerboards in the vertical sense. The number of points of each line being 500, one will have $$\frac{500}{2}$$

that is 250 checkerboards in the horizontal sense. According to the invention one interrupts the cathode beam periodically in order to cause only one point out of two to appear.

One connects to the deflection electrodes of the tube a saw tooth scanning voltage in the manner in which it is used in standard receivers: voltage with line cadence in the horizontal sense and voltage with image cadence in the vertical sense; but one arranges for the electronic beam to be displaced in height corresponding to 3 points in the vertical sense during the scanning of each horizontal line. Under these conditions the point indicated by the digit 1 in each of the 150 by 200 checkerboards finds itself explored successively in the course of the first scanning.

When the first scanning of the 150 x 250 first points has been completed, one begins again, but making sure, according to the invention, to apply permanently the proper deviation for the exploration of the digit 2 of the checkerboard.

On the Figure 1, one has identified by 0 and +1 the two vertical columns of the checkerboard and by 0+1+2+3 the horizontal rows of the checkerboard.

The second scanning corresponds to the digit 2. That digit is located in the second vertical column (+1) and in the third horizontal row (+2).

One operates in the same manner a third scanning, corresponding to digit 3 with an added voltage of 0 in the horizontal sense and +1 in the vertical sense and one explores thus anew 150 x 250 points of image.

One begins again a fourth scanning corresponding to the digit 4 with an added voltage of 1 in the horizontal sense and 0 in the vertical sense.

Then a fifth scanning corresponding to the digit 5 with an added voltage of 0 in the horizontal sense and 2 in the vertical sense.

Finally a sixth scanning, with an added voltage of 1 in the horizontal sense and of 1 in the vertical sense.

After which, the six scannings having been completed, that is to say, all the points of image having been explored, the cycle is repeated with a new exploration of the digit 1 which corresponds to a new image.

Figure 2:
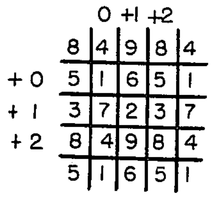

The Figure 2 relates to the case of a checkerboard of 9 points, and the numbers inscribed in the squares indicate the order of scanning. As for the inscribed numbers, 0+1+2, above and to the left of the cross lines, they indicate the auxiliary deflection voltages to be employed according to the technique already described in connection with the Figure 1.

Figure 3:
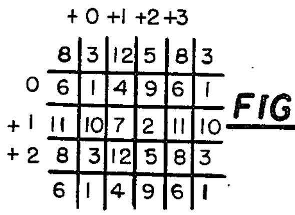

In the checkerboard of 12 elements of Figure 3, one is able to achieve exploration with 4 values of deflection voltages following the horizontal and 3 following the vertical.

For covering the 16 elements of the checkerboard of Figure 4, the 4 values of voltage 0+1+2+3 are necessary for the vertical deflection and 4 values of voltage 0+1+2+3 are necessary for the horizontal deflection.

Figure 5:
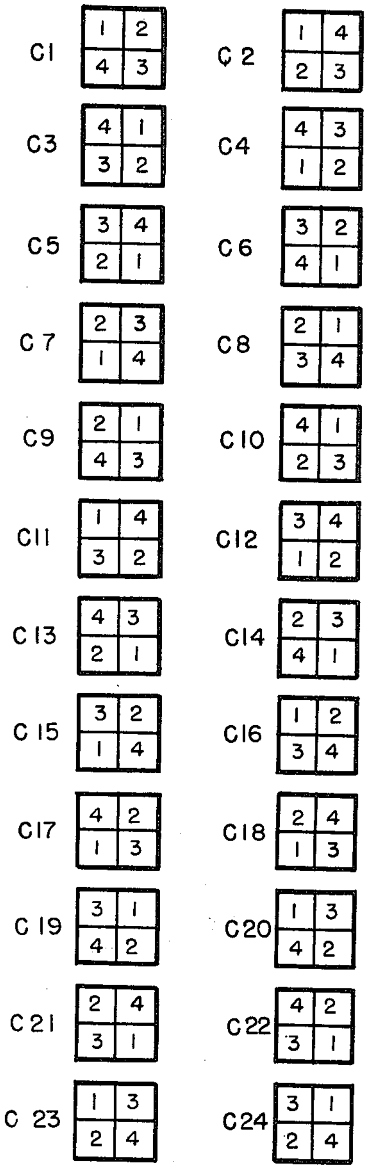

Figure 5 represents all the different combinations of order of exploration which can be obtained with a checkerboard of only 4 points: they are at number factorial 4, that is to say 4×3×2×1, that is 24. They are referred to by $C_1$, $C_2$ . . . $C_{24}$.

Figure 6:
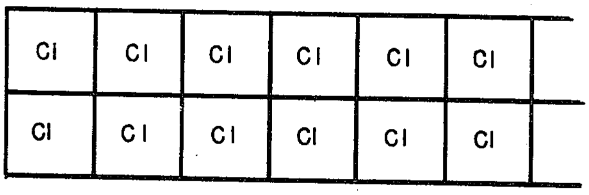
Figure 6 represents the simplest manner of exploration which one is able to obtain by always employing the same checkerboard combination.

Figure 6 shows how in a first variation one explores the whole surface 4 times consecutively, employing the order of exploration given in the combination of $C_1$ only. One could make the same exclusive use of any other of the combinations of 4 elements of Figure 5; if instead of a checkerboard of 4 points, a checkerboard of 16 points should be used (Figure 4), one would have 16 factorial combinations, a number which is extremely high. Considering that it is necessary to know the combination to be employed in the exploration to obtain an image at the receiving station with clarity, this method permits the complete assurance in a very excellent manner of secrecy in the transmission of images.

Figure 7:
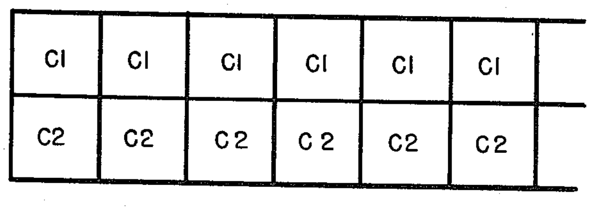
Figure 7 is an improved variation in which one employs two combinations $C_1$ and $C_2$; the first line employs the points of the combination $C_1$, the second line the points of the combination $C_2$ and following alternatively.

Figure 7 is an improved variation. One makes use of a line of a checkerboard in which the combination $C_1$ appears exclusively (odd line). One then employs a line of a checkerboard in which the combination $C_2$ appears exclusively (even line).

The following line of a checkerboard employs anew the combination $C_1$ (odd line) and one continues the exploration of the whole image employing alternatively the checkerboards $C_1$ and $C_2$ for the even and odd lines.

Figure 8:
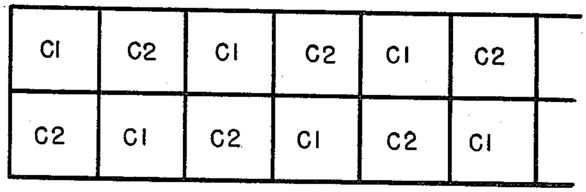
Figure 8 is another improved variation in which one employs alternatively the combination of $C_1$ and $C_2$ along the horizontal line and one shifts these combinations on the end of line.

Figure 8 is another improved variation in which one makes alternately on each line of the checkerboard the combinations $C_1$ and $C_2$, being careful to shift the point of starting of the second line in relation to the first. For the third line one returns to the order of succession of the elements $C_1$ and $C_2$ of the first line of the checkerboard and thus successively for the even and odd lines of the checkerboard.

Instead of the two combinations $C_1$ and $C_2$ alternatively one is able, according to the invention, to employ any number. In employing the checkerboards of Figure 4 as well in the vertical sense or in the horizontal sense, and one is able to modify at will the amplitude of shift between the adjacent elements of the vertical lines.

Instead of a checkerboard of only four elements, one is able, according to the invention, to utilize any type of checkerboard, for example, those described in the Figures 1 to 4; that is: 2 by 3 or 3 by 5, 4 by 4 or 5 by 5, etc. and between these elements the invention permits the exploration with all possible arrangements.

Figure 9:
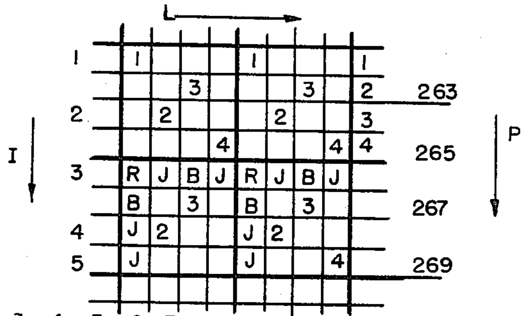
Figure 9 is an application of the principle of the invention to television in color by the three-color process.

The Figure 9 represents six groups of checkerboards of 16 points each usable for three-color images. One shall notice that the number of points J (color yellow) is equal to the sum of the number of point R (red) and B (blue). One obtains automatically a phase shift of the points of the different horizontal lines of a pitch of four lines, particularly applicable to three-color television with point interlace scanning, by the use of three complementary colors, R red, J yellow and B blue.

In the Figure 9, the lines are horizontal and follow one another in the order indicated by the numbers 1, 2, 3, 4, 5, 6, 7, 8, 9 written to the right of the checkerboard. The sequences are indicated on the right of these numbers. The exploration is made following the horizontal arrows L which appear above the checkerboard. The arrow I refers to the odd images, the arrow P to the even images.

To facilitate the identification of the elements corresponding to the colors B, R and I (that is to say to blue, to red and to yellow) one places the letters B, R and J on some of the ones of the squares of the checkerboard.

In referring to the numerical indications of the sequences carried on the right of the grill of Figure 9, one sees that all the points of image are explored by two successive scannings corresponding to a group of odd lines and a group of even lines. The scanning can begin on a point R, after which come the points JBJ of the cycle, RJR RJB JRJ BJR JBR . . . It is of importance in order to have the best results to avoid vertical lines of color.

When the exploration of the first field has begun with R, it is advisable to begin the third line on the point J, the point R being shifted one row to the right in relation to the first line. The line 5 begins anew on the point R. The line 7 is again shifted one row to the right and thus in turn to the end of the exploration of the first field of odd lines.

During the exploration of the second field of even lines and as indicated by the number to be seen on the right of the Figure 9, the line 2 is explored but all of the points are shifted two rows to the right with reference to the line 1 of the first field. With the exploration of the line 4 occurs another shift of one row with reference to line 2, thence the scanning of the line 6 in the same manner as that of line 2 and so on to the end of the second field comprising the even lines.

On the Figure 10 one has represented on the first line N the order of sixteen successive scannings of image. On the second line V one has indicated the value of the voltages which are to be applied in the vertical sense and on the third line H one has indicated the values of the voltages which are to be applied in the horizontal sense to obtain the selected order of exploration as described in Figure 4. The choice of these values is easily understood according to the explanation which has been given above in connection with Figure 1. The voltages to be applied in the vertical sense V are successively: 0; 2; 3; 1; 2; 0; 3; 1; 0; 2; 1; 3; 2; 0; 1; 3; 0; and in the horizontal sense H, 0; 1; 3; 2; 0; 3; 1; 0; 2; 3; 1; 0; 2; 1; 3; 2; 0. The Figure 11 is a construction which permits obtaining the different voltages described on the Figure 10 and enables also exploration of the checkerboards of the Figure 4. The output of the receiver of radio 50 is connected to a single separator 51 supplying three distinct channels which correspond: the first V to the video signals; the second I to the end of image synchronization signals; and the third L to the end of line synchronization signals. The video signals are applied through a secondary transformer 52 to the modulating grid of a cathode ray tube 53. The signals of the end of line synchronize the sawtooth voltage generator 54 supplying the horizontal deflection plate 53A of this tube 53. The pulses of the end of line I also supply, as is well known to the art, a sawtooth voltage relaxation oscillator 56 supplying the vertical deflection plate 53C. The pulses produced by the generator 54 in the sawtooth serve to synchronize a frequency multiplier. Its relationship of multiplication corresponds to the number of checkerboards existing in each horizontal line of the televised image (for example 250 in the case of Figure 1 referred to above). The voltage of the output of multiplier 55 has the effect to bring the grid of the tube 53 to a voltage around zero (which allows the modulation coming through channel V), during a fraction only of a period, for example one-half the time for the exploration in the case of Figure 1 and one-quarter the time for the exploration in the case of Figure 4. During the half or the three-quarters remaining of the period, the grid is brought to a high negative voltage which practically interrupts the electronic beam and suppresses the effect of the modulation beam.

As is customary, during the moment when the grid is not polarized, it controls the video signal and assures the faithful reproduction of the darkness of the point under consideration. When the electronic beam is interrupted, the screen is not lighted, so that the explored points successively appear separate one from the other.

For the purpose of obtaining the different scannings with the selected position in the checkerboard, one employs a group of revolving commutators which apply continuously on the two deflection plates 53B and 53D the voltage already determined above.

On the figure can be seen the first arm 59, turning to contact the sixteen segments 57, connected to the second vertical plate 53D and a second arm 60, sweeping also on the sixteen segments 58, connected to the second horizontal deflection plate 53B. These two arms 59 and 60 are driven together by a small synchronous motor 61 synchronized on the end of image pulses I. The number of poles in this motor is a function of the number images to be explored (the number of squares of the checkerboard). In the case of the checkerboard of Figure 4, the motor has two times sixteen poles as one must make sixteen successive explorations of image.

In Figure 11 the different sectors 57 are supplied by the connections from a source 63 having a grounded terminal and comprising four plugs supplying the voltages zero, +1V, +2V, +3V. The segments 58 are also supplied with different voltages, +1V, +2V, etc. from a source 64 having a grounded terminal. The successive sectors are connected to terminals having the indicated value on the Figure 10. The first line V indicates the voltages applied to the successive segments 57. The second line H indicates the voltages applied to the successive segments 58. One is able to represent in the following manner the performance of the system. The position of the arms 59 and 60 is such that at the beginning of the scanning of each image, each arm is found at the beginning of a segment. During the entire duration of the scanning of that segment the voltages on the plates 53B and 53D are maintained constant so that all the points of image corresponding to a determined number of the checkerboard are explored. During the rapid return of the cathode beam of the end of image, the scanning arms 59 and 60 pass from one segment to the next. New values are thus applied to the second electrodes, vertical and horizontal, 53B and 53D; the general direction of the cathode beam is modified and the point of image corresponding to a second square of the checkerboard is likewise explored and so on.

If one had employed a checkerboard of nine elements of the Figure 2, the scanning will have been realized following that given in the table below:

| | | | | | | | | | |
|---|---|---|---|---|---|---|---|---|---|
| Order of exploration: | 1; | 2; | 3; | 4; | 5; | 6; | 7; | 8; | 9 |
| Horizontal deviation voltage: | 0; | 1; | 2; | 0; | 2; | 1; | 0; | 2; | 1 |
| Vertical deviation voltage: | 0; | 1; | 1; | 2; | 0; | 0; | 1; | 2; | 2 |

In this case the turning commutators would have nine segments instead of sixteen.

In the case of the checkerboard with sixteen elements represented in Figure 4, if the image comprises for example 400 lines of 500 points each, one is able to divide the surface to be scanned in 125 groups in width and 100 in height. One is able to assume for the purpose of discussion that one has chosen a frequency of image equal to 96 per second. The necessary time to explore all of the points of image is therefore 96 divided by 16, that is 6 per second. Under these conditions, the video frequency applied to the control grid of the tube 53 would be 96 times 100 times 125, that is 1,200,000 per second and a line frequency of 96,000 per second. The pulse frequency of the oscillator 55 would be also equal to 1,200,000 pulses per second. The speed of the synchronous motor would be 96 divided by 16, that is 6 turns per second. In the system of exploration which has just been described, the complete image is scanned using always the same squares of the checkerboard and the changing of position of the square used is effected only at the end of scanning of image. It is desirable in certain applications to provide two degrees of phase shift in the horizontal direction.

When one uses an exploration of interlaced lines, one explores only one line of two so that the odd lines of the checkerboard are scanned first, then the even lines. Anticipating a horizontal phase shift at the end of each scanning of image, one is able to change the position of the square of the checkerboard employed without making the intervening auxiliary vertical displacement.

According to a perfected variation of the invention, one makes another phase shift at the end of each line. According to the invention, the second deviation system which is added to the first goes into action for each exploration of field corresponding to the even lines. This combination of deflectors with a superposed effect on the line frequency and the image frequency, enables one to realize by the application in succession of several rotating commutators such as those in the Figure 12.

Figure 12 is a perfected variation following which one changes the position of the square explored in each checkerboard, not only at the beginning of each exploration of image, but as well at the beginning of each line. Following the invention, one employs in series two controlling devices, one synchronized on the end of line pulses and the other on the end of image pulses. The simultaneous action of the two commutators permits obtaining selected types of scaning by interlaced points.

As one is able to see on Figure 12, the high frequency waves are received at 50. A separator 51 permits the sending of the video signals in the first channel V, the image signals in the channel I and the end of line signals in the channel L. A relaxation oscillator 54 is synchronized with the end of line signals in channel L and supplies the plate 53A of the tube 53. A second relaxation oscillator 56 for scanning is synchronized with the frequency of image I and supplies the plate 53C. The signals of the end of line serve also to synchronize a frequency multiplier 55 which periodically impresses on the grid of the cathode tube 53A very high frequency. The arrangements assure in a general way an exploration by separate points. The single end of image I synchronizes a small synchronous motor 61 which drives the arm of commutator 65 at a speed corresponding to half the frequency of end of image. The arm of commutator 65 is displaced in contact with the segments 66 and 67, the former connected by the conductor 68 to the ground terminal of a battery having a value of voltage 2V (the choice of the value V has been explained on the Figures 1–3) which has its other terminal connected to segment 67 by the conductor 70. The conductor 71 connects the arm of the commutator 65 to a terminal of resistor 72 having another terminal connected to the earth pole of the battery 69 so that at the terminals of this resistance appears a decrease of voltage which represents in some way the output of that element of the circuit.

A second small synchronous motor 73 is synchronized with the frequency of the end of line by the conductor 74 and drives a second arm of commutator 75 at a speed corresponding to half the frequency of the end of line L. The arm 75 turns to contact the segments 76 and 77. The conductor 78 connects segment 26 to a terminal 79 of battery 80 having a value V. This terminal 79 is connected by the conductor 83 to the other pole of the battery 80. The arm of commutator 75 is connected through resistance 86 to the point 84 of the conductor 82 by the conductor 85. The conductor 87 connects the point 88 of conductor 85 to the deflection plate 53B of tube 53. Therefore when the arm 75 touches the segment 76 it short circuits the resistance 86 and when on the other hand the arm 75 touches the segment 77 this resistance 86 is applied to the terminals of the battery 80 and causes a decrease of voltage having the value V. The respective decreases of voltage of 2V through resistance 72 and of 1V through the resistance 86 are of the opposite sense and add their effects on the plate 53B of tube 53. In combining thus their effects by means of two commutators one is able to obtain the conditions of Figure 9 in the following manner.

At the beginning of the scanning, the arm 75 touches the first part of segment 76 and the arm 65 touches the first part of segment 66. The decrease of voltage is null on the two resistances 72 and 86. Therefore there is no deflection voltage and the explored point is the red point R of Figure 9. At the end of scanning of the first line, the commutator 75 passes from the segment 76 to the segment 77, inserting, as has been seen, the resistance 86 to the terminals of which appear the voltage of one volt which applied to the deflection plate 53B advances by one row to the right all the points of the line. The third line of the field is thus scanned with a phase shift equal to one unit.

After the line 3, the arm of commutator 75 passes from the segment 77 to the segment 76, placing the resistance 86 in short circuit, which supplies no voltage at all to the circuit of the deflection plate. Following the return of the deflection voltage to zero, the line 5 undergoes the same scanning as the line 1 has undergone.

After the line 5, the arm 75 returns to the segment 77 and the deflection voltage of 1V which result assures a scanning of the line 7 with a phase shift equal to one unit. The cycle of operations described repeats itself until a complete exploration of the field of odd lines.

At that moment the commutator arm 65 passes from segment 66 to the segment 67, and connects the resistance 72 to the terminals of the battery 69. There is thus supplied to the deflection plate 53B a voltage of 2V, which produces a phase shift equal to two units in the course of scanning in the entire field of even lines. In particular, the line 2, which is the first line of the second field, undergoes a phase shift equal to two units with reference to the line 1. After the line 2 the arm 75 passes to the segment 77 and causes the application of 3V on the plate 53B following the addition of deflection voltages of 2V already acquired and the decrease of 1V through the resistance 86. The line 4 of the second field and the line 264 of the image are explored in the same manner with a phase shift 3 with respect to line 1 and so on. One succeeds therefore in achieving the scanning corresponding to the arrangement of exploration chart of Figure 9.

The arrangement which has just been described is applied to the case where the deviation action is applied only on one of the deflection plates (horizontal). It is evident that a similar procedure could also be applied equally to the second vertical deflection plate.

The new mode of exploration which has just been described finds an important application in three-color. The invention permits the suppression of the phenomenon of flickering colors which generally manifests itself. It may be utilized equally on the receiving screens in which the colors are arranged in the form of vertical bands.

The arrangement is notably applicable when the choice of colors is modified at the end of each scanning of image.

The invention permits the utilization of deflection voltages introduced to the circuit of Figures 11 and 12. One of its variations is to explore successfully each field in a single color while being able to blend the different colors which produces an excellent quality of image. The position of explored points follows the principle of exploration of the knight's move or interlaced points, which supplies excellent clarity. That combination eliminates the apparent crawling of colors (stroboscopic effect) in the event of movement of the eyes as a result of the persistence of the impression on the retina. For example, the connections on the segment (Figure 12) enables one to achieve the exploration of the type described in Figures 5 to 9 in such a way that the first field would be explored by the selection of red elements exclusively on the odd lines, the second by the exclusive selection of the yellow elements on the even lines, the third by the exclusive selection of the blue elements on the odd lines and the fourth by the exclusive selection of other yellow elements on the even lines. It may happen that certain points of the surface may never be scanned. That is notably the case of a square checkerboard of sixteen points where the yellow elements are equal to the sum of the red and blue elements together.

That shortcoming can be corrected (*a*) by employing different widths of groups, (*b*) by making equal the area of the red elements, blue and yellow, (*c*) by lining up in a line the elements having a certain color.

When there are uninterrupted continuous vertical lines of color on the screen, one is able, thanks to the knight's move scanning, to jump the points and to obtain that the whole scanning of the field be effected with one color alone. As an example of the principle *b* above, one shall employ it in scanning the first field in such a way to explore the points R on the odd lines, one will explore the second field by selecting the points J on the even lines, the third in selecting the points B on the odd lines and the fourth the points R on the even lines, which will correspond to a complete image. For the following image, one will scan the first field by exploring only the points J on the odd lines and then following each cycle repeats itself by moving up one color. The advantages of knight's move scanning lie in great part in the exploration of the elements of the same color in each exploration of image because of the physical separation of the colors one obtains up to a certain point the knight's move effect.

Following a perfected variation of the invention, instead of using the arrangement of mechanical commutators described in the Figures 11 and 12, one is able to obtain by an entirely static method the auxiliary deviation voltages.

The Figure 13 explains how one is able to obtain during an exactly known time (and corresponding for example to the duration of a scanning of image) the signals of rectangular form having an exactly determined amplitude.

One calls upon an alternating voltage generator G which supplies through a polarized battery, a resistance 11 in which appears a voltage in the form of sawtoothed points and a rectifier 7.

According to the invention, one is enabled to limit the amplitude of this point to an appropriate value by use of a rectifier 8 suitably polarized by a battery 10. For the exploration of the 4 by 4 squares the voltage of that battery can have four different values. On that figure one has represented schematically by the commutator 9 the means which enable the selection of a desired amplitude. According to whether the commutator is on the one or the other of the segments, the pulse is cut to a level more or less elevated and one succeeds therefore in having a signal having any desired amplitude.

On Figure 17, one sees to an enlarged scale, one of the points which has been isolated by means of the rectifier 7. On that curve one has drawn in dots the several values corresponding to the position of the commutator 9. The cross hatched part 24 represents the form of signal obtained when the commutator 9 is in the second position. This rectangular shaped signal appears on the terminal 13, which is employed to apply the desired voltage to the deviation plate during the remainder of the scanning under consideration; a decoupling resistance 12 is provided on the circuit.

The generator voltage G is preferably in the form of a pulse and is obtained by the superposition of several sinusoidal voltages of the frequencies $n_1$, $n_1$F, $n_2$F, the one being a harmonic of the other. The value of the voltage has a function of time as represented at 21 in the Figure 16. At the beginning of the signals of synchronization of the end of image represented at 25 on that figure, one initiates the action of several oscillators.

On Figure 16, one has represented as a function of time at 18 and 19 the voltages provided by these oscillators at a frequency of 2F and 3F; the curve 21 results from the superposition of the curves 18 and 19. By means of a rectifier, properly polarized, one isolates each of the points, which means to shift the curve in the vertical sense and isolating each of the points (cross hatched) thus produced. One constructs as many of the curves as one desires having the signal of the same form, and these curves are shifted the one with respect to the other; one employs the technique already known and described by the author in his French patent No. 840,915.

Starting from these two oscillators $n_1$F and $n_2$F, one creates the distribution of phase shift currents. From these distributions and by means of a coupling of appropriate values, one is able to create in the independent circuits the voltages in the form of points, all having the same form and phase shifted with respect the one to the other. The maxima of the curves 21, 22 and 23 in number equal to those of the successive signals which one wishes to obtain, are regularly distributed in the course of time.

If one wishes to obtain an exploration of a checkerboard of 16 squares, one is led according to the invention to utilizing for example three oscillators having as a common multiple the frequency of scanning of one entire image. One makes use of 16 points of voltage, regularly phase shifted the one with respect to the other and such as represented in the Figure 18.

The Figure 14 shows how, by utilizing several times the showing of the Figure 13, one is able to supply to the deflection plates the several required voltages as desired.

The different points (to the number 16 for example) supply each time a group of resistances and rectifiers. The rectangular voltages which appear successively in each construction are arranged in parallel through the decoupling resistances 12, 12′, 12″, etc. The terminals of these resistances, 13, 13′, 13″, are connected to the second deflection plate of the tube. The effects of these voltages are thus added. To obtain as a function of time the cross hatch curve (Figure 18) which corresponds to the explored picture of 16 squares just referred to, one should adjust the first commutator 9 on the segment 0, the second commutator 9′ on the segment 2 and the third on the segment 3 and so on. One obtains thus the signals corresponding to the cross hatch curve.

If the checkerboard to be explored comprises only four squares, it is no longer necessary to call upon a generator G comprising several frequencies, sub-multiples the one with respect to the other, but one is able to be satisfied with the employment of a single sinusoidal voltage, thus in this manner the arrangement greatly simplifies itself.

Figure 15 describes a static arrangement giving the same result as the mechanical system described in Figure 12, that is to say, permitting the change of a phase shift of explored points not only at the end of each scanning of image but equally at the end of each scanning of line. One has represented at 90 the receiving set which receives the radio waves 107, then amplifies and separates the video signal V, the end of line signal L and the end of image signal I.

A first oscillator 94 connected on the end of image pulses I, furnishes on the line 97 a voltage of the frequency half of those of the end of image. That line supplies to secondaries of the transformer: the first 98 is in phase, the second 99 in opposition. The voltage supplied by the secondary 98 is rectified by the rectifier 102 so that a pulse of voltage corresponding to a half alternation appears in the resistance 108. The rectifier 104 and the resistor 101 contribute to limit the value of that first signal as has just been explained in connection with the Figure 13. In the particular case, one has supposed that the first signal was 0 so that one has not placed the battery in series on the rectifier 104.

The voltage in phase opposition with the proceeding furnished by the secondary 99 permits by means of rectifier 107 obtaining in the resistance 103 a voltage pulse dephased by 180 electrical degrees with respect to that preceding. One limits the amplitude of that point and one obtains a signal of known value thanks to rectifier 108, to the battery 119 and the resistance 116 which limits the currents.

The effect of the signals obtained at 110 on the resistance 108 and at 120 on the resistance 123 is combined in 124, by means of the decoupling resistances 105 and 125. By analogous manner one synchronizes on the half of the end of line frequency another oscillator 93 which supplies an alternative distribution line 126. That line supplies a transformer which provides a voltage in phase 127 and a voltage in opposition 128. One employs the voltage of 127 and by means of rectifier 133 one obtains at the resistance 137 a pulse of voltage in phase. One limits the amplitude of that pulse by the combined action of the rectifier 134, by the resistance 132 which limits the current and the conductor 135 of which the voltage is conveniently chosen. In the particular case of the figure no battery at all has been represented so that the first signal is 0.

One employs in the same manner the voltage 128 and by means of the rectifier 144 one obtains in the resistance 151 a pulse of voltage in opposite phase. One limits the amplitude of that voltage pulse by means of rectifier 145, of the battery 147 and of the resistance 143 and one thus obtains a signal of rectangular form as explained above in connection with Figure 13.

The signals obtained in 141 at the terminals of the resistance 137 are utilized through the decoupling resistance 139 and those obtained on 148 through the terminals of the resistance 151 are utilized through the decoupling resistance 152. The effects are added in 154.

One combines in 142 the voltages obtained in 125 and 154 and one applies them to the second deflection plate 53D of the cathode beam tube. The first deflection plates of that tube receive, as is customary, the sawtooth voltages for scanning; the scanning line 92 synchronized on the signal L, the scanning image 143 synchronized on the pulses of the end of image I. The video current V is applied to the control grid of the cathode beam tube through a system 91 which periodically interrupts the beam at the frequency of the pulses. That system is synchronized on a multiple of the end of line image.

The constructions which have just been described relate to one form of receiver but it is obvious that equivalent arrangements are applicable in the same way to a transmitter, iconoscope, image orthocon, etc.

*Résumé*

The present application concerns discontinuous interlaced scanning in television systems and is a continuation-in-part of copending application Serial No. 149,062, filed May 11, 1950, and an improvement upon applicant's U.S. Patent No. 2,479,880.

The invention lies in the particular manner in which a television screen is scanned so that "color crawl" is eliminated and a clearer, more brilliant image is obtained. While the invention improves the black and white image it is especially suited to the improvement of the three color television image.

According to applicant's basic patent in the art, see above, under RCA and most of the industry is licensed, a television screen is regarded as divided into several hundred lines, each line comprising several hundred dots, comprising the picture image. These individual dots were scanned one after another throughout each line in what was substantially a continuous line prior to applicant's patent. The result was often a grayed-out picture of somewhat drab appearance and uneven in light value.

Applicant's patent taught discontinuous scanning of dots in a line and treated the television screen as divided into a number of checkerboard patterns, such as shown in Figure 4, each containing sixteen dots. The individual dots were then scanned in each checkerboard in the sequence shown by the little numbered squares each of which represents a dot. As a conventional television tube has five hundred twenty-five lines each with four hundred fifty dots, the above patent taught the use of a grid comprising about one hundred thirty checkerboards high by one hundred twelve wide. Each checkerboard is four dots square, comprising sixteen dots in all. The deflecting coils of the cathode ray tube are accordingly constructed to scan every fourth line, being the top line of each small checkerboard and every fourth dot along the line, being the little squares numbered "1" in Figure 4. The first field of scanning according to the above patent is then every fourth dot in every fourth line, comprising about one hundred twelve dots in each of lines 1, 5, 9, 13, 17, 21, etc. The second field comprises all the dots numbered "2" in each small checkerboard. It will be seen that the displacement between dots "1" and "2" corresponds to the "knight's move" in chess and it is obtained by the superposition of small incremental voltages upon the tube deflection system. When the superposed incremental voltages are zero the tube scans all the "1" dots as described above. When the superposed voltages are +2 in the vertical direction and +1 in the horizontal, the tube scans all the "2" dots. It will be seen that the "3" dots are scanned when the superposed voltages are +3 and +3 as shown in Figure 4.

After sixteen fields all the squares in every small checkerboard were covered and the sequence is repeated beginning with the seventeenth field, the same small checkerboards being used throughout. Although the above system is a great improvement over the scanning of alternate complete lines, it has been found particularly in three-color television that the little checkerboards tend to stand out from the picture and produce a moving mosaic or pattern effect. The effect is sometimes seen in animated billboards where a traveling pattern moves across a contrasting background. This action detracts from the television picture and can cause such discomfort in viewing that a color television receiver may become unbearable.

*The invention as a process or method*

The solution to the above problem, and the instant invention, lies in charging the small checkerboard so that a different sequence of dots is used on adjacent checkerboards. In this way the dot arrangement in each little checkerboard does not impress itself on the observer. Each small checkerboard loses its individuality and all tend to merge together. The observer no longer finds himself subconsciously following a small individual square group of dots moving across the image as if it had independent existence and a life of its own.

In Figure 4 the simplest checkerboard of four dots has been selected and as there shown, twenty-four different sequences of dot scanning, making twenty-four different checkerboard patterns which may be scanned. As a result the group of dots comprising the small checkerboard never impresses its group individually on the observer and a brilliant even picture free from defect is obtained. It will be appreciated that greater variation is possible where checkerboards having more than four dots are used. The four-dot checkerboard is employed for illustration because of its simplicity.

Of course not all the twenty-four variants shown in Figure 5 need be used to obtain the desired effect and to practice the invention. Figure 6 shows simplified dispersed or discontinuous dot interlace scanning according to the said patent where the same checkerboard is used throughout. Figures 7 and 8 show simple forms of variable discontinuous dot interlace scanning according to the invention in which adjacent checkerboards are different.

A more general statement of the invention in graphic form is shown in Figure 19, using $C_1$; $C_4$; $C_5$ and $C_8$ of Figure 5.

According to the simple form shown in Figure 19, scanning according to the invention is as follows:

Each frame comprises sixteen fields—

Field 1 marked by one red dot in each square
Field 2 marked by one green dot in each square
Field 3 marked by one blue dot in each square
Field 4 marked by one yellow dot in each square
Field 5 marked by two red dots in each square
Field 6 marked by two green dots in each square
Field 7 marked by two blue dots in each square
Field 8 marked by two yellow dots in each square The succeeding eight fields are marked by corresponding short colored bars. It will be seen that each checkerboard is surrounded by another checkerboard with a different arrangement of dot sequence. As a result, there is no continuity of pattern and therefore no apparent movement of a checkerboard across the picture image.

The above may be said to comprise a method of scanning which is one form of the invention.

*The invention as a device*

As shown in Figures 1 to 5 inclusive, the secondary displacement of a cathode ray beam to a selected dot e.g. "3" within a selected checkerboard e.g. $C_1$ is obtained by superimposing a small voltage upon the main deflecting voltage along each axis. If we can think of the beam as displaced to a given checkerboard, such as $C_1$, somewhere on the picture image, and assume for simplicity that +1 volt will move the beam one dot corresponding to the numbered squares making up the checkerboards, then the main deflecting circuit will direct the beam at "1" in $C_1$ and to scan dot "3," selected above, it will be necessary to superimpose one additional volt in the horizontal direction and one additional volt in the vertical direction. These small superimposed voltage increments are supplied in a regular patterned sequence by a simple commutating switch device such as shown in Figures 11 and 14 which apply small stepped voltages from a battery such as 40 to the deflection plates **83*a*–83*d* of a cathode ray tube 83** in a preselected sequence to provide a scanning pattern such as that shown graphically above in which the sequence of dot scanning in adjacent checkerboards is different, so that continuity of apparent movement of a dot group is broken. Figure 15 shows a circuit for obtaining the small incremental voltages in a desired sequence without a commutator or similar moving parts which have limitations and disadvantages.

It will be understood that the above discontinuous dot interlace scanning system is equally applicable to a flat screen of the wall type where an electron gun is not employed, but a grid having apertures corresponding to elemental picture areas is gated to admit charged particle flow in the form of individual "beams" according to a desired scanning pattern. Reference is made to my copending applications and U.S. patents among which are the following: app. S.N. 321,095 filed June 12, 1951, now U.S. Patent No. 2,713,517; app. S.N. 508,144 filed May 13, 1955, now abandoned; U.S. Patent No. 2,558,019 filed April 2, 1947; U.S. Patent No. 2,595,617 filed November 18, 1948; U.S. Patent No. 2,760,119 filed January 15, 1952.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

Having thus described my invention I claim:

1. In an electron beam scanning system, an explored surface defined by a plurality of groups of elemental dot areas, each group defining substantially a rectangular area comprising phosphors of a plurality of colors, means for generating an electron scanning beam, means for horizontally and vertically deflecting said beam in synchronism with a line and field frequency respectively, periodical modulation means causing said beam to approach cut off sufficiently closely to reduce the effect of the beam on said explored surface below a value deemed to have an undesirable effect on said surface during deflection of said beam, means for synchronizing said deflecting means and said periodical modulation means so that at least one elemental dot area in each of said groups is scanned during each field and different elemental dot areas in each of said groups are scanned during successive ones of said fields, said deflecting means having auxiliary deflecting means being so constructed that it periodically alters the scanning sequence of said elemental dot areas within successively scanned individual groups.

2. The combination set forth in claim 1, in which said modulation means causes periodical interruption of said beam in synchronism with said deflection means, each said group comprising a checkerboard arrangement having at least four elemental dot areas.

3. An electron beam scanning system, comprising an explored surface defined by a plurality of groups of at least four substantially equal elemental dot areas extending substantially equidistantly along two coordinates and comprising charged particle responsive material for producing a plurality of colors, means for generating an electron scanning beam, means for deflecting said beam along said coordinates in synchronism with a line and a field sequence, said beam periodically decreasing the primary electron content of said beam to reduce its light producing effect on said surface to a noninterfering value, means for so synchronizing said means for deflecting and said means for producing periodical decreases in primary electron content of said beam that a corresponding elemental dot area in each of said groups is scanned during each field and that different elemental dot areas in each group are scanned during successive ones of said fields, said deflecting means having an auxiliary source of signals connected thereto being so constructed and arranged that it periodically alters the scanning sequence of said elemental dot areas within successively scanned individual groups.

4. An electron beam scanning system, comprising an explored surface defined by a plurality of groups of at least four substantially equally elemental dot areas extending substantially equidistantly along two coordinates and comprising charged particle responsive material for producing a plurality of colors, means for generating charged particles, means for applying said charged particles to said surface along said coordinates in synchronism with a line and field sequence, that a corresponding elemental dot area in each of said groups is scanned during each field and that different elemental dot areas in each group are scanned during successive fields, said means for applying said charged particles comprising stepped voltage producing means for providing voltages corresponding to the coordinates of the positions of said elemental areas on said surface.

5. An electron beam scanning system comprising electron beam producing means, an explored surface in the path of said beam, deflecting means adjacent said beam and causing said beam to periodically scan elemental dot areas of said surface said deflecting means comprising means causing said beam to remain substantially stationary on each of said elemental dot areas for a predetermined time and then causing said beam to move rapidly to the next elemental dot area to be explored, beam modulation means synchronized with said deflecting means and causing the intensity of said beam to be reduced during said rapid movements, said deflecting means comprising stepped voltage producing means having opposed rectifier elements for causing said beam to scan different individual elemental dot areas of predetermined groups of elemental dot areas in successive explorations of said surface, said deflecting means including further means periodically changing the number of elemental dot areas in each of said groups.

6. A television system comprising picture means, said picture means comprising a plurality of groups of elemental areas, each group having areas for producing a plurality of colors means to scan said elemental areas in course of successive fields, said means to scan comprising means for selecting different scanning sequences of elemental areas in successive groups to be scanned.

7. The combination set forth in claim 6, each group having the same number of elemental areas.

8. The combination set forth in claim 7, said groups being arranged in horizontal alignment.

9. The combination set forth in claim 6, each group having the same number of elemental areas, said groups being arranged in horizontal and vertical alignment, said last means selecting said elemental areas in a predetermined order having a periodicity equal to the number of elemental areas in each group.

10. A television system comprising a television receiver having a picture screen comprising a plurality of groups of elemental areas, each group comprising areas of a plurality of colors, means to scan said elemental areas in course of successive fields, said means to scan comprising means for selecting different sequences of relative position of individual elemental areas in successive groups to be scanned, whereby color crawl is eliminated.

11. The combination set forth in claim 10, said receiver comprising a cathode ray tube having deflecting means constructed to cause the beam to move in a periodic sequence of discrete steps.

12. The combination set forth in claim 11, means for applying discrete electrical values to said deflecting means in accordance with a preselected periodic sequence and means for determining the periodic sequence said groups substantially all having the same number of areas, said means to scan being constructed to provide a number of fields per frame bearing a whole number relation to the number of areas in each group.

References Cited in the file of this patent

UNITED STATES PATENTS

| | | |
|---|---|---|
| 2,093,157 | Nakashima | Sept. 14, 1937 |
| 2,472,774 | Mayle | June 7, 1949 |
| 2,479,880 | Toulon | Aug. 3, 1949 |
| 2,508,267 | Kasperowicz | May 16, 1950 |
| 2,586,482 | Rose | Feb. 19, 1952 |
| 2,595,548 | Schroeder | May 6, 1952 |